United States Patent [19]

Davis

[11] Patent Number: 4,654,947
[45] Date of Patent: Apr. 7, 1987

[54] DRILL BIT AND METHOD OF RENEWING DRILL BIT CUTTING FACE

[75] Inventor: Kenneth Davis, Midland, Tex.
[73] Assignee: W. Wesley Perry, Midland, Tex.
[21] Appl. No.: 803,325
[22] Filed: Dec. 2, 1985
[51] Int. Cl.$^4$ .......................... F21C 13/00; B23P 7/00
[52] U.S. Cl. .................... 29/402.08; 29/426.5; 76/101 A; 76/108 R; 175/383; 175/413
[58] Field of Search .................. 29/426.5, 402.08; 175/315, 329, 383, 410, 413; 279/1 E; 407/22, 44, 102; 408/1, 145; 76/101 A, 108 R, DIG. 12

[56] References Cited

U.S. PATENT DOCUMENTS

| | | | |
|---|---|---|---|
| 2,348,293 | 5/1944 | Hamer | 29/426.5 |
| 2,429,967 | 10/1947 | Sorensen | 29/426.5 |
| 2,439,692 | 4/1948 | McKay | 29/426.5 |
| 2,557,619 | 6/1951 | Swart | 29/426.5 |
| 2,901,222 | 8/1959 | Pease, Jr. | 175/329 |
| 2,958,119 | 11/1960 | Stansfield | 407/40 |
| 3,075,593 | 1/1963 | Holsing | 175/383 |
| 3,537,539 | 11/1970 | Adcock | 175/413 |
| 3,858,671 | 1/1975 | Kita et al. | 175/410 |
| 4,200,159 | 8/1980 | Peschel et al. | 175/410 X |
| 4,222,446 | 9/1980 | Vasek | 175/329 |
| 4,553,615 | 11/1985 | Grainger | 175/329 |

*Primary Examiner*—James M. Meister
*Attorney, Agent, or Firm*—Marcus L. Bates

[57] ABSTRACT

Method and apparatus by which the cutting face of a drill bit is renewed. The drill bit has a cutting face comprised of a plurality of radially spaced apart stud assemblies, each received within a socket. A polycrystalline diamond disc forms one end of the stud assembly. The socket is in the form of a counterbore extending angularly into the bit body so that when a marginal end of the stud assembly is forced into a socket, a portion of the face of the diamond disc extends below the bottom of the bit body for engagement with the bottom of a borehole. A passageway communicates with the rear of the counterbore and extends back to a surface of the bit. Fluid pressure is effected within the passageway, thereby developing sufficient pressure differential across the stud assembly to cause the stud assembly to move respective to the socket. This action forces a marginal end of the stud assembly to move sufficiently respective to the socket so that the free marginal end of the stud assembly can be grasped by a tool and manipulated in a manner to bring an unused cutting edge of the diamond disc into operative cutting relationship respective to the bottom of the bit. The reoriented stud assembly is forced back onto seated relationship respective to the socket. The stud assembly includes a circumferentially extending seal means which cooperates with the socket interior with a piston-like action.

9 Claims, 7 Drawing Figures

DRILL BIT AND METHOD OF RENEWING DRILL BIT CUTTING FACE

BACKGROUND OF THE INVENTION

This application is a substitute of application Ser. No. 256,892 filed Apr. 23, 1981, now abandoned.

Diamond drill bits have become more practical in recent years because of the commercially available polycrystalline diamond disc which can be attached to a support stud, thereby providing a stud assembly which can be placed within the bottom of a bit body to form a cutting face. As the diamond bit penetrates a formation, only the lowermost crescent shaped edge portion of the layer of diamond material on the disc is subjected to extreme abrasive wear. Consequently, the efficiency of the cutting action of the bit diminishes as the wear progresses, and eventually the bit must be replaced, although perhaps 80% of the polycrystalline layer of diamond material on the disc has been unused.

In my co-pending substitute patent application Ser. No. 803,326 filed Dec. 2, 1985, and Ser. No. 803,331 filed Dec. 2,1985, there is set forth method and apparatus by which a stud assembly can be removed from a bit body, rotated about the longitudinal axial centerline thereof, and replaced into the bit body, thereby taking advantage of the unworn portion of the diamond bit. In the past, in order to carry out this operation, it has been necessary to heat the bit body so that differential expansion between the stud assembly and bit body alleviates the task of extracting the stud assembly from the stud socket.

It would therefore be advantageous to be able to remove a stud assembly from a bit body without incorporating differential expansion between the bit body and stud assembly. It would be desirable to be able to remove the stud assembly from the bit body, reorient the stud assembly in a definite predetermined relative position respective to the bit body, and reassemble the stud assembly into its socket. These desirable goals are the subject of the present invention.

SUMMARY OF THE INVENTION

A drill bit has a lower formation engaging face which includes a plurality of stud assemblies mounted in a socket formed within the bit body. The sockets are in the form of a counterbore having an outer end and an inner end. A passageway extends from the inner end of the counterbore into communication with the outer surface of the bit at a location spaced from the outer end of the socket.

The stud assembly is cylindrical in form and has a cutting face opposed to a rear face. A marginal length of the stud assembly is received within the socket thereby presenting part of the cutting face below the bit body for engagement with a geological formation.

Fluid pressure is applied to the interior of the passageway, thereby exerting a fluid force against the inner side of the stud assembly. The pressure is increased until the pressure differential across the stud assembly forces the stud assembly to move along the longitudinal axial centerline thereof and from the socket. The removed stud assembly is reoriented respective to the socket and forced back into the socket to present a new or unused cutting edge to the formation.

Seal means are provided about the stud assembly by which the area between the stud assembly and the interior socket wall is sealed, thereby imparting the stud assembly with a piston like action respective to the socket. Fastener means are provided by which the stud assembly is maintained releasably engaged within the socket.

A primary object of the present invention is the provision of a method of removing stud assemblies from a bit body.

Another object of this invention is the provision of both method and apparatus by which the cutting efficiency of a diamond drill bit is increased.

A further object of this invention is the provision of a method of removing a diamond stud assembly from a drill bit body and rotating the stud assembly along its axial centerline so that an unworn cutting edge of the diamond disc is presented to the formation.

Another and still further object of this invention is the provision of method and apparatus for forcing a polycrystalline diamond stud assembly from a drill bit body.

An additional object of this invention is the provision of method and apparatus for forcing a polycrystalline diamond stud assembly from a drill bit body, and for repositioning the stud assembly within the drill bit body, with the stud assembly being reoriented to present an unworn cutting face to a formation penetrated by the bit.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described in the above abstract and summary.

DETAILED DESCRIPTION OF THE PREFERRED EMBODIMENTS

Figure 1:
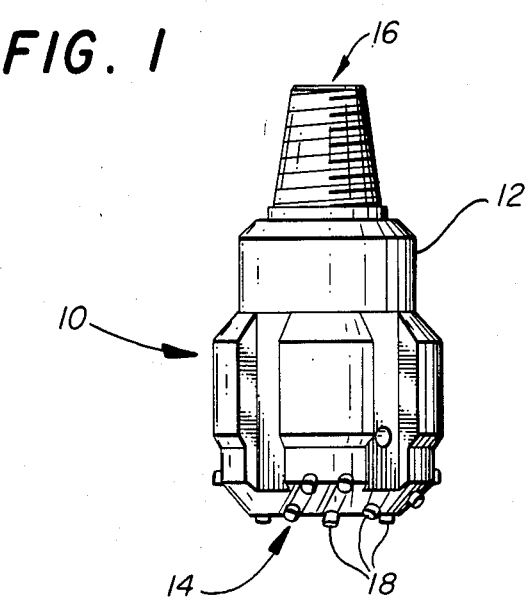
FIG. 1 is a perspective, side view of a diamond drill bid made in accordance with the present invention.

In FIG. 1, there is disclosed a drill bit 10 made in accordance with the present invention. The drill bit includes a main unitary body 12 which has a formation engaging face 14 formed at the lower end thereof, and a threaded connection 16 formed at the upper end thereof. A plurality of stud assemblies 18 form the lower formation engaging or cutting face of the bit.

Figure 2:
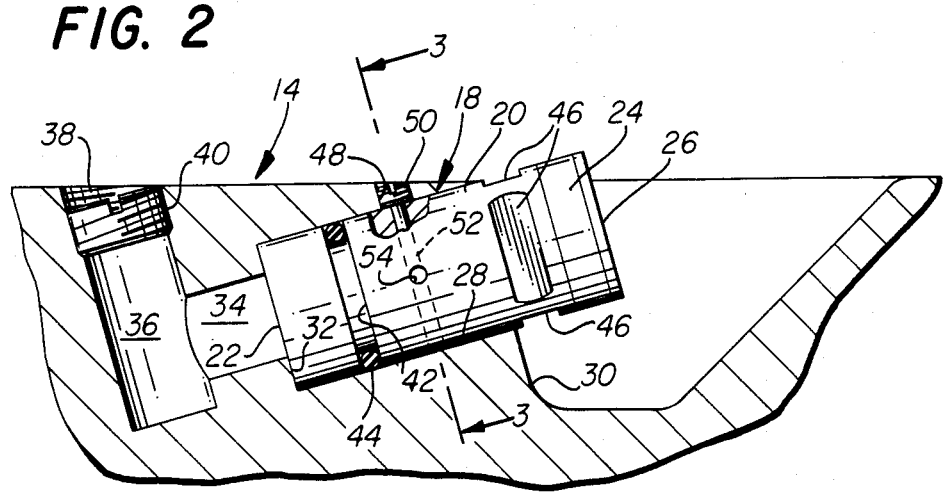
FIG. 2 is an enlarged, fragmented, part cross-sectional view of part of the drill bit illustrated in FIG. 1.
Figure 3:
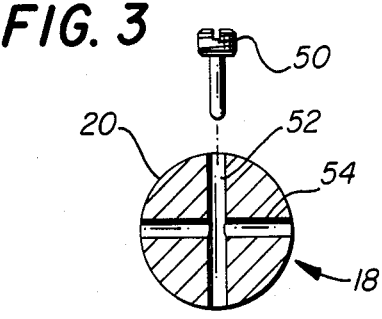
FIG. 3 is a cross-sectional view taken along line 3—3 of FIG. 2.
Figure 4:
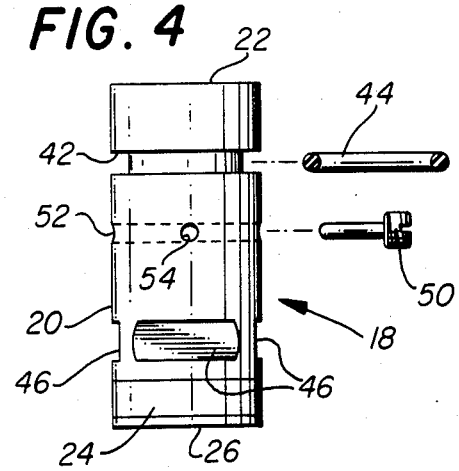
FIG. 4 is a detailed, exploded view of part of the apparatus disclosed in the foregoing figures.

In FIGS. 2-4, the stud assembly details are more fully set forth. The stud assembly includes a body 20, a rear face 22, and a cutting disc 24 at the opposed or outer end thereof. A layer of polycrystalline diamond substance is applied to the outer face 26 of the disc. The stud assembly is received within a socket, preferably in the form of a counterbore 28. The counterbore exits the drill bit body at 30. An annular seat 32 is formed between the counterbore and a reduced diameter passageway 34. The passageway turns laterally at 36 and exits the outer surface of the bit at 38. The outer ends of the passageway and the counterbore are spaced apart. A plug 40 threadedly engages the outer marginal end of the passageway and prevents debris from entering thereinto.

The stud assembly includes a circumferentially extending o-ring groove 42, and a resilient o-ring 44 is seated therewithin. Circumferentially extending wrench flats 46 are radially spaced about a medial outer marginal length of the stud assembly. Perpendicularly arranged apertures 52 and 54 receive a marginal end of an elongated set screw 50 therewithin. The set screw is threadedly received within a set screw threaded hole 48.

Figure 5:
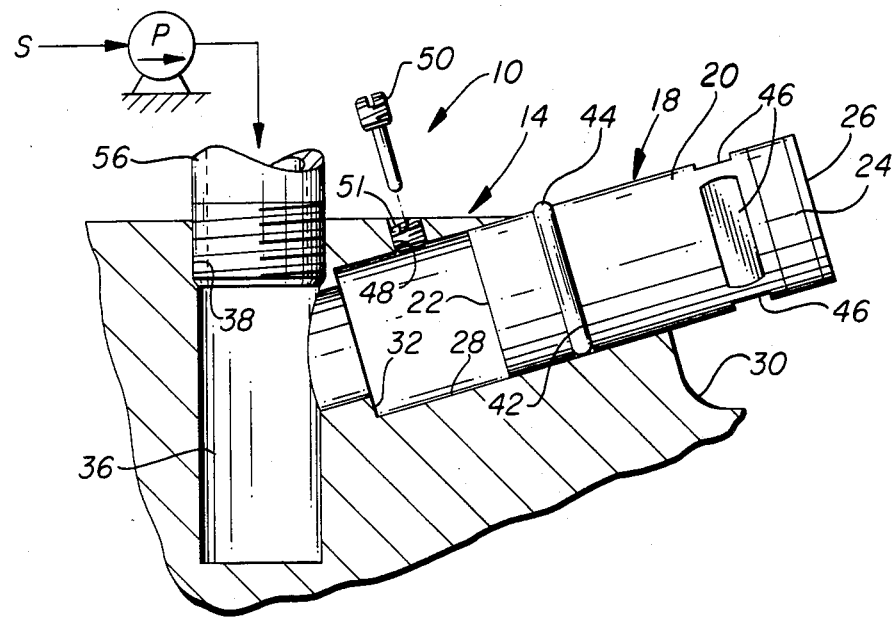
FIG. 5 illustrates a different configuration of the apparatus shown in FIG. 2.

In FIG. 5, the set screw has been removed from the set screw hole and a plug 51 substituted therefor. A pipe 56 has been threadedly received within passageway 36, and a pump is connected by conduit 56 to a source of non-compressible fluid, such as axle grease. In FIG. 5, sufficient pressure has been provided within passageway 36 to exert a force against the rear face 22 of the stud assembly to provide a pressure differential across the stud assembly of a magnitude sufficient to force the stud assembly to move along its longitudinal axial centerline in a direction away from the socket.

Figure 6:
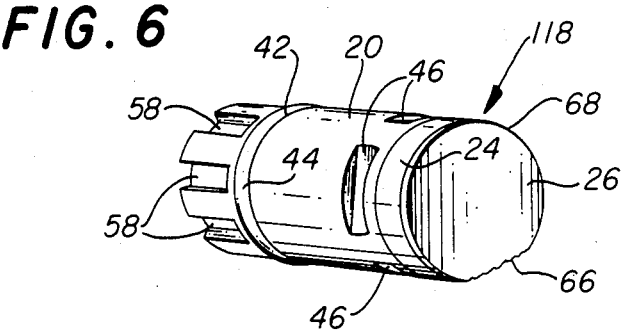
FIG. 6 is a perspective view of an alternant embodiment of the apparatus disclosed in FIG. 4; and, FIG. 7 is an isolated, fragmented, cross-sectional view which illustrates the operation of the apparatus disclosed in FIG. 6.
Figure 7:
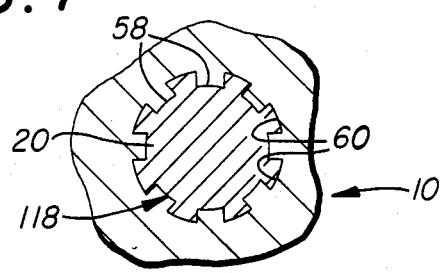

In FIGS. 6 and 7, the stud assembly has been provided with spline connections 58 at the rear face thereof, and the inside marginal end of the socket has been provided with splines 60 made complementary respective to splines 58 of the stud assembly.

In operation, the stud assemblies are positioned within the sockets of the drill bit, with set screws 50 maintaining the stud assemblies in seated relationship within the counterbores in the illustrated manner of FIG. 2, thereby exposing a portion of the polycrystalline diamond cutting face to the formation. After the bit has been used downhole a considerable length of time, a segment of the diamond face will become worn as illustrated at 66 in FIG. 6, for example, thereby reducing the cutting efficiency of the drill bit. The drill bit is removed from the borehole, the set screw is removed from the set screw hole, and a suitable conduit 56 is connected by the illustrated pump to a source of non-compressible fluid, preferably lub grease or the like. Pressure is applied to passageway 36, thereby developing sufficient increased pressure across the rear face of the stud assembly to force the stud assembly to move from the illustrated position of FIG. 2 into the illustrated position of FIG. 5.

At this time, the wrench flats of the stud assembly can be engaged with a suitable open end wrench, and the stud assembly rotated about its longitudinal axial centerline an amount to move the worn segment 66 away from a position which admits engagement thereof with the formation, and to bring an unworn segment 68 of the stud assembly into cutting engagement respective to the formation. Conduit 56 is removed from passageway 36, and the stud assembly is forced from the position of FIG. 5 back into seated engagement with the socket as illustrated in FIG. 2. The plug 40 is replaced, set screw 50 is replaced within one of the set screw passageways 52 or 54, thereby renewing the cutting efficiency of the drill bit. After all of the stud assemblies have been renewed in the above manner, the drill bit can again be used downhole for another interval of time. The above rejuvenation process can be carried out so long as a suitable cutting edge is left on the diamond disc.

It is unnecessary to completely remove the stud assembly from the socket, unless the entire stud assembly must be replaced. It is possible to pump the stud assembly into the illustrated position seen in FIG. 5, rotate the stud assembly by engaging a wrench with the wrench flats, and thereafter press the stud assembly back into an operative position. In the illustrated embodiment seen in FIGS. 3 and 4, the stud assembly must be rotated 90°, 180° or 270° because of the relationship of the passageways 52 and 54, respective to the single set screw hole 48. It is possible, while remaining within the comprehension of this invention, to provide other fastener means which enable the stud assembly to be rotated a different rotational angular relationship. For example, as seen in FIGS. 6 and 7, the stud assembly can be provided with a spline connection which is indexed with a similar complementary female spline connection formed in the socket.

I claim:

1. In a drill bit having a lower formation engaging face which includes a plurality of sockets formed therein, a stud assembly mounted in each socket, the method of removing the stud assemblies from the bit face comprising the steps of:

placing a seal means about each stud assembly so that a stud assembly can sealingly reciprocate within a socket with a piston-like action;

forming a reduced diameter passageway which extends rearwardly from communication with each socket to the exterior of the bit;

flowing fluid into the passageway, thereby exerting fluid pressure against the rear end of the stud assembly;

applying sufficient pressure to the fluid within the passageway to produce a pressure differential across the stud assembly to force the stud assembly to move outwardly in a direction away from the socket, thereby releasing the stud assembly from the socket.

2. The method of claim 1 wherein the step of forming said passageway is carried out by:

forming a socket passageway along the longitudinal axial passageway of said socket;

forming a blind passageway which extends from the bit face into intersecting relationship respective to the socket passageway;

said socket passageway and said blind passageway are arranged laterally of one another and jointly form the first recited passageway.

3. The method of claim 2 wherein the stud assembly is rotated about its longitudinal axis an amount to orient an unused cutting edge of the stud assembly cutting face into cutting relationship respective to the bit face.

4. The method of claim 3 wherein fastener means are provided by which the stud assembly is secured in fixed relationship respective to the socket.

5. The method of claim 1 wherein the stud assembly is held within said blind passageway in alignment with the socket passageway by a fastener means; and, the stud assembly is rotated about the longitudinal axis thereof to present a satisfactory cutting edge to the formation.

6. The method of claim 1 wherein said stud assembly includes a diamond cutting face thereon, and further includes the steps of:

rotating said cutting face to present an unused cutting edge to the formation after the stud assembly has been moved respective to the socket;

and replacing said stud assembly within the socket.

7. Method of improving the cutting efficiency of a drill bit comprising the steps of:

(1) making a stud assembly substantially in the form of a cylinder and placing a cutting face at one end thereof;

(2) forming a socket through the formation engaging face of the bit and orienting the longitudinal axial centerline of the socket respective to the longitudinal axial centerline of the bit body so that when a stud assembly is forced into the socket, at least part of the cutting face of the stud assembly is located below the bit face whereby the cutting face can engage and penetrate a formation;

(3) providing a seal means about the stud assembly so that the stud assembly sealingly cooperates with the socket with an action similar to a piston and cylinder assembly;

(4) forming a passageway which extends from communication with said socket, rearwardly and to an outer surface of the bit, said passageway having an inside diameter which is smaller than the inside diameter of said socket;

(5) forcing a stud assembly into a socket;

(6) using the bit downhole in a borehole until one edge portion of the cutting face of the stud assembly has worn away;

(7) renewing the cutting ability of the bit by flowing a fluid into the passageway, and increasing the pressure within the passageway to provide a pressure differential across the stud assembly of a magnitude which forces the stud assembly to move outwardly respective to said socket;

(8) rotating the stud assembly along the longitudinal axial centerline thereof to present an unused cutting edge to the formation; and, forcing the stud assembly back into the socket.

8. The method of claim 7 wherein the step of forming said passageway is carried out by:

forming a socket passageway along the longitudinal axial passageway of said socket;

forming a blind passageway which extends from the bit surface into intersecting relationship respective to the socket passageway;

said socket passageway and said blind passageway are arranged laterally respective to one another, and jointly form the first recited passageway;

placing a supply conduit within said blind passageway and forcing fluid to move through the conduit and into the socket passageway, to thereby force the stud assembly to move respective to said socket.

9. In a drill bit having a lower formation engaging face at which there is mounted a plurality of stud assemblies; a plurality of outwardly opening sockets having a longitudinal axial centerline placed at an acute angle respective to a horizontal plane which is normal to the longitudinal central axis of the bit; said sockets being radially spaced from the bit axis; a cylindrical stud assembly having a cutting face at a far end thereof which is spaced from a near end thereof, said assembly being of a configuration to be slidably received in close tolerance relationship within one of said sockets, the improvement comprising:

a passageway which commences at the bit face at a location which is spaced from the entrance of said socket; said passageway is of reduced diameter respective to the diameter of said socket, and has an inside end thereof connected to the inside end of the socket; said socket has an axial centerline which intersects the axial centerline of the inner end of said passageway;

seal means formed about the stud assembly by which the stud assembly sealingly cooperates with the socket interior;

said stud assembly is forced into said socket with the cutting face thereof extending beyond the bit face; and, said stud assembly can be forced from said socket by forcing fluid to flow into the passageway, where fluid pressure is exerted against the near end of the stud assembly, whereupon the pressure differential across the stud assembly forces the stud assembly to move from the socket.

* * * * *